(12) United States Patent
Tucker

(10) Patent No.: US 12,514,225 B2
(45) Date of Patent: Jan. 6, 2026

(54) PET CLEANING AND TREATMENT APPARATUS AND METHOD

(71) Applicant: Jackie Tucker, Soquel, CA (US)

(72) Inventor: Jackie Tucker, Soquel, CA (US)

( * ) Notice: Subject to any disclaimer, the term of this patent is extended or adjusted under 35 U.S.C. 154(b) by 378 days.

(21) Appl. No.: 18/341,969

(22) Filed: Jun. 27, 2023

(65) Prior Publication Data

US 2025/0000055 A1     Jan. 2, 2025

(51) Int. Cl.
| | | |
|---|---|---|
| *A01K 13/00* | (2006.01) | |
| *A47L 5/14* | (2006.01) | |
| *A47L 7/00* | (2006.01) | |
| *A47L 9/06* | (2006.01) | |
| *A47L 9/08* | (2006.01) | |
| *A47L 9/18* | (2006.01) | |
| *A47L 9/24* | (2006.01) | |
| *A47L 9/28* | (2006.01) | |
| *G06F 3/16* | (2006.01) | |

(52) U.S. Cl.
CPC .............. *A01K 13/001* (2013.01); *A47L 5/14* (2013.01); *A47L 7/0066* (2013.01); *A47L 9/0673* (2013.01); *A47L 9/08* (2013.01); *A47L 9/181* (2013.01); *A47L 9/242* (2013.01); *A47L 9/2842* (2013.01); *A47L 9/2857* (2013.01); *G06F 3/167* (2013.01)

(58) Field of Classification Search
CPC ....... A01K 13/001; A47L 5/14; A47L 7/0066; A47L 9/0673; A47L 9/08; A47L 9/181; A47L 9/242; A47L 9/2842; A47L 9/2857; G06F 3/167
See application file for complete search history.

(56) References Cited

U.S. PATENT DOCUMENTS

| | | | |
|---|---|---|---|
| 2006/0102096 A1* | 5/2006 | Cho ..................... | A01K 13/001 119/671 |
| 2011/0017147 A1* | 1/2011 | Petruzzi ............... | A01K 13/001 119/671 |
| 2013/0305998 A1* | 11/2013 | Brown ................. | A01K 13/001 119/603 |
| 2015/0100037 A1* | 4/2015 | Allsup ................. | A01K 13/002 119/51.01 |
| 2017/0094939 A1* | 4/2017 | Wright ................ | A01K 13/001 |
| 2020/0100465 A1* | 4/2020 | Kim ..................... | A01K 13/001 |
| 2021/0051921 A1* | 2/2021 | Hoffmann ........... | A01K 13/001 |
| 2022/0047127 A1* | 2/2022 | Hong ..................... | A47L 9/183 |

(Continued)

FOREIGN PATENT DOCUMENTS

| | | | | |
|---|---|---|---|---|
| JP | H08112299 A | * | 5/1996 | |
| KR | 20180002645 U | * | 9/2018 | ............... A47K 3/28 |

*Primary Examiner* — Rami R Okasha
(74) *Attorney, Agent, or Firm* — Donald R. Boys; Central Coast Patent Agengy LLC

(57) ABSTRACT

A pet cleaning and treatment system has a variety of operating modes, including vacuum, washing, drying, dual vacuum and drying, misting, discharge, internal cleaning and refill and reset. Different modes may be selected and initiated by a user through a control interface which is in one embodiment an interactive interface on a touchscreen of a smartphone or a pad device, and in another embodiment a voice activated unit through which the user may select modes and control functions by voice commands. There is a hand-held application instrument connected by flexible tubings to supply heated water, vacuum and mist as needed.

17 Claims, 8 Drawing Sheets

(56) References Cited

U.S. PATENT DOCUMENTS

| | | | |
|---|---|---|---|
| 2022/0369594 A1* | 11/2022 | Velasco | A01K 13/001 |
| 2023/0165216 A1* | 6/2023 | Crompton | A01K 13/003 |
| | | | 119/601 |
| 2024/0268344 A1* | 8/2024 | Nachtigall-Fournier | |
| | | | A01K 13/001 |

* cited by examiner

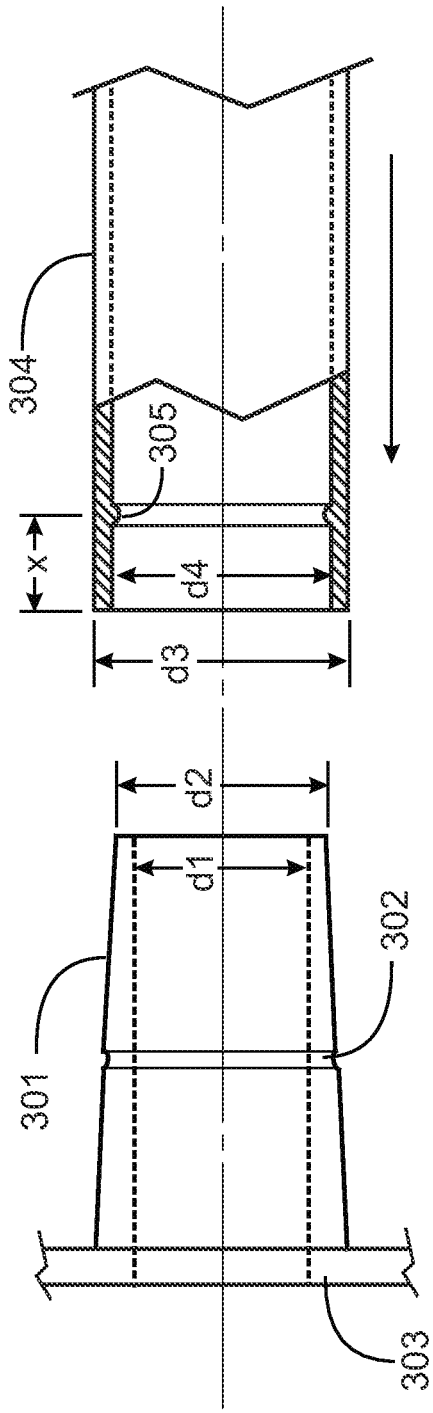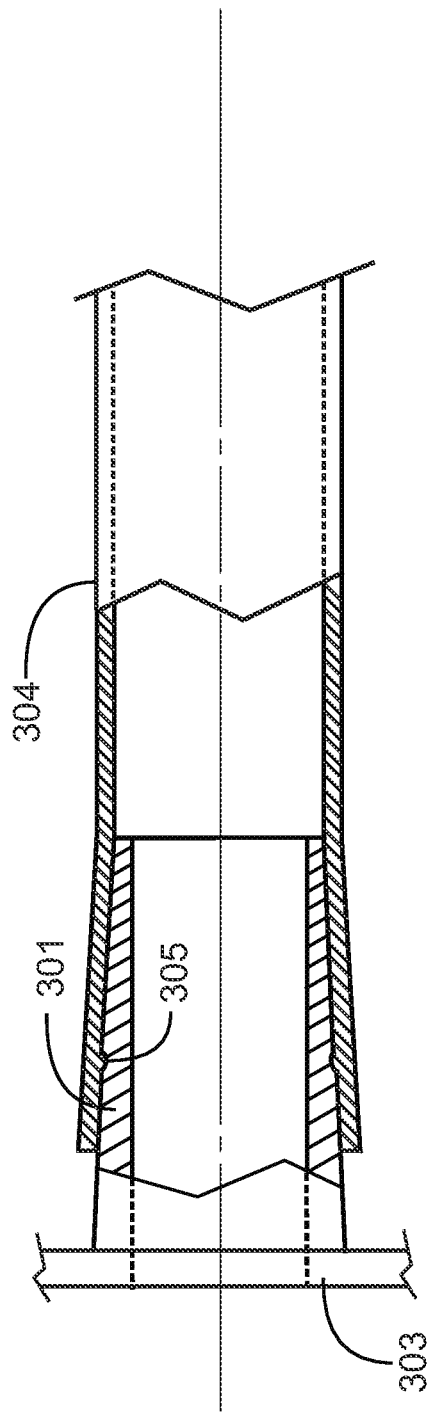
Fig. 3A  Fig. 3B  Fig. 3C

- Off/On
- Vacuum Mode
- Washing Mode
- Drying Mode
- Dual Vacuum Drying Mode
- Misting Mode
- Discharge Mode
- Internal Cleaning Mode
- Refill and Reset Mode

*Fig. 4*

PET CLEANING AND TREATMENT APPARATUS AND METHOD

BACKGROUND OF THE INVENTION

1. Field of the Invention

The present invention is in the technical field of apparatus for cleaning fur of pets, particularly dogs, and pertains more specifically to a multiple-function system with improved vacuum and filtering.

2. Description of Related Art

There are known to exist a broad variety of systems for washing and drying the fur of pets, such as dogs, and for other processes in regard to the pets as well. Dog washing stations are well known and available in many pet stores and other locales, where pet owners may take their pets and use the station for washing and sometimes drying their pet. Vacuum systems are known as well with handheld apparatus connected to a vacuum system by a flexible tubing, to vacuum such as hair from the pet.

It is also well known that existing pet washing and cleaning apparatus are subject to many unsolved problems, such as filtering out hair drawn in through a vacuum system, and disposal of the hair. Another unmet need is that existing apparatus is typically single purpose. Another is that existing apparatus is difficult or complicated to service and clean.

What is needed is a pet cleaning and treating apparatus that is multi-purpose, easy and uncomplicated to clean and service, and has an efficient filtering system for detritus drawn in in vacuum processing.

BRIEF SUMMARY OF THE INVENTION

In one embodiment of the invention a pet cleaning and treatment system is provided, comprising an enclosure supported on a floor surface on legs, a water reservoir in the enclosure adapted to hold a volume of water with an empty region over the water, the enclosure having a first solenoid valve in a first connector conduit through a wall of the enclosure opening on one end beneath a surface of the water and on an opposite end outside the enclosure, a vacuum module in the enclosure, comprising a vacuum pump with a solenoid operated valved inlet conduit opening in the empty region over the water, and an exhaust conduit through a wall of the enclosure, a substantially round, hand-held application instrument having a substantially cylindrical wall with a top closure, open at a lower extremity, with a second and a third connector conduit extending through the top closure upward away from the top closure, a plurality of especially configured flexible tubings open on both ends, adapted to engage the connector conduits, a source of heated water in the enclosure with a fourth solenoid valved connector conduit through the wall of the enclosure, adapted to engage one of the especially configured flexible tubings, a source of heated air within the enclosure with a fifth solenoid valved connector conduit through the wall of the enclosure, adapted to engage one of the especially configured flexible tubings, a source of heated mist within the enclosure with a sixth solenoid valved connector conduit through the wall of the enclosure, adapted to engage one of the especially configured flexible tubings, and control apparatus and circuitry adapted to receive input from a user and to accordingly selectively operate functional apparatus of the system including the solenoid operated valves. The system is characterized in that the user connects one of the especially configured flexible tubings to one of the connector conduits on the application instrument and to one of the solenoid valved connector conduits on the enclosure, provides control input through the control apparatus, and grasps and manipulates the application instrument to treat the pet.

In one embodiment the control apparatus and circuitry comprises an on-board CPU coupled to a data repository, the CPU executing coded instructions enabling the CPU, in response to user input, to selectively open and close the solenoid operated valves and to selectively operate electrical heaters and pumps. Also, in one embodiment the system is placed exclusively in one or another operating mode by user input, individual modes being associated exclusively with operation of specific apparatus of the system. In one embodiment the system is placed in a vacuum mode by user input with an especially configured flexible tubing connected to a valved conduit through a wall of the enclosure, the valved conduit connected internally to the vacuum module in the enclosure, with the especially configured flexible tubing connected at one end to one of the connector conduits of the application instrument, enabling the user to manipulate the application instrument to vacuum the hair of the pet. In one embodiment the system is placed in a washing mode by user input, with an especially configured flexible tubing connected to a valved conduit through a wall of the enclosure, the valved conduit connected internally to the source of heated water in the enclosure, with the especially configured flexible tubing connected at one end to one of the connector conduits of the application instrument, enabling the user to manipulate the application instrument to wet the hair of the pet, to add soap to wash the hair of the pet, and to rinse the hair of the pet after washing. And in one embodiment the user is enabled through the control apparatus and circuitry to selectively start and stop the flow of heated water, and also to increase or decrease the temperature of the heated water.

In one embodiment the system is placed in a drying mode by user input, with an especially configured flexible tubing connected to a valved conduit through a wall of the enclosure, the valved conduit connected internally to the source of heated air in the enclosure, with the especially configured flexible tubing connected at one end to one of the connector conduits of the application instrument, enabling the user to manipulate the application instrument to dry the hair of the pet. Also, in one embodiment the system is placed in a dual vacuum and drying mode by user input, with a first especially configured flexible tubing connected to a connector conduit in turn connected to the vacuum system, and to a first of the connector conduits on the application instrument, and a second especially configured flexible tubing connected to a connector conduit in turn connected to the source of heated air, with the second especially configured flexible tubing also connected to the second of the connector conduits on the application instrument, enabling the user to employ both vacuum and heated air in drying the pet. In one embodiment the system is placed in a misting mode by user input, with a first especially configured flexible tubing connected to a connector conduit in turn connected to the source of heated mist, and to a first of the connector conduits on the application instrument, enabling the user to apply heated mist to the hair of the pet. In one embodiment the system is placed in a discharge mode by user input, enabling the user to open both a solenoid operated discharge valve in a conduit through a bottom wall of the enclosure and a solenoid operated vent valve in the enclosure above the water level to drain the water reservoir. And in one embodiment the system is placed in an internal cleaning mode by user input, further comprising a solenoid operated input valve in a conduit through a side wall of the enclosure connectable to a source of water under pressure, the input valve operable to clean inner walls of the enclosure with water sprayed under pressure with the discharge valve open.

In one embodiment the system is placed in a refill and reset mode, enabling the user to close the discharge valve and to open the solenoid operated input valve, the system monitoring a water level sensor, refilling the water reservoir to a select depth, then closing the input valve and turning the system off. In one embodiment each connector conduit has a tapered body with a minimum diameter at one end of the body, a central through bore, and a concentric groove around an outside wall of the tapered body at a specific position along a length of the body, and each especially configured flexible tubing has a smooth inside diameter substantially the same as the minimum diameter of the tapered body of the connector conduit, and an internal circular ridge with dimensions matching the groove in the tapered body of the connector conduit, such that the especially configured flexible tubing is urged over the tapered body of the connector conduit until the internal circular ridge engages the groove in the tapered body, completing a secure joining of the especially configured flexible tubing to the connector conduit. And in one embodiment the control apparatus and circuitry adapted to receive input from a user and to accordingly selectively operate functional apparatus of the system including the solenoid operated valves, comprises internal apparatus with a CPU and a coupled data repository, the CPU executing coded instructions from the data repository, the CPU coupled to solenoid operated valves of the system and to electrical and electronic elements and adapted to operate the valves and electronic and electrical elements, and the input from the user is through touch screen indicia on an interactive display of a smartphone or a pad device.

In one embodiment the system further comprises a voice activated control apparatus adapted to be proximate the user, the voice activated apparatus having a CPU and a coupled data repository and executing coded instructions from the data repository, and having wireless communication circuitry adapted to transmit commands to compatible wireless communication circuitry in the control apparatus and circuitry in the enclosure, wherein a user is enabled to select and activate different operating modes by voice command though a microphone of the voice activated control apparatus, and to control system functions in the different modes by voice command. In one embodiment the voice activated control apparatus further comprises a speaker, and the internal control system is enabled to provide responses to voice commands back to the user through the speaker. And in one embodiment the application instrument has a physical interface whereby a variety of combs of different length and lateral spacing are interchangeably mounted.

BRIEF DESCRIPTION OF THE SEVERAL VIEWS OF THE DRAWINGS

FIG. 3A is an elevation view of a connector conduit in an embodiment of the invention.

FIG. 3B is a partially sectioned view of an especially configured flexible tubing in an embodiment of the invention.

FIG. 3C is a partially sectioned view of the elements of FIGS. 3A and 3B joined in an embodiment of the invention.

FIG. 4 is a partial list of modes in an embodiment of the invention.

DETAILED DESCRIPTION OF THE INVENTION

Figure 1:
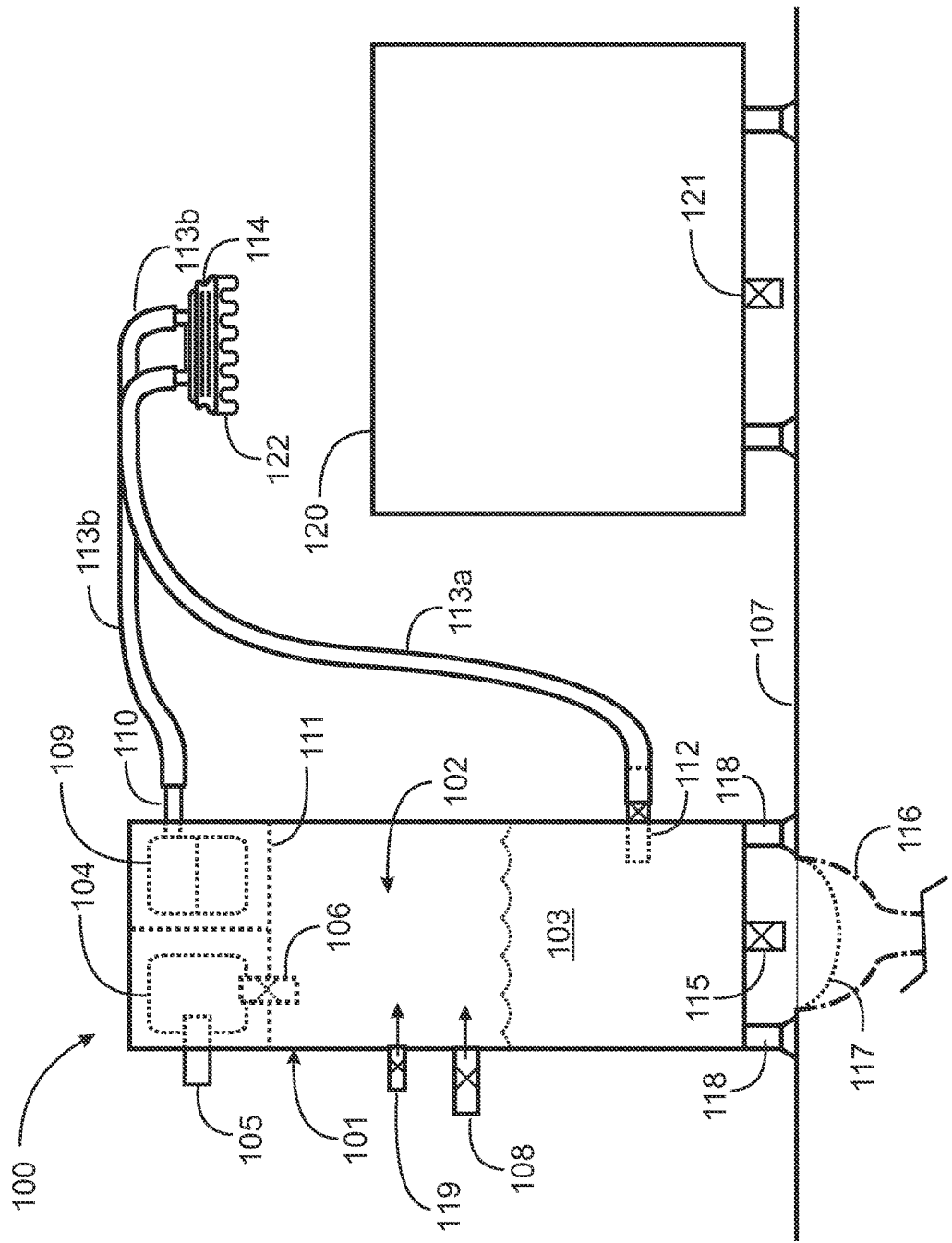
FIG. 1 is an assembly view of a pet cleaning apparatus in an embodiment of the invention.

FIG. 1 is an assembly view of a pet cleaning apparatus 100 in an embodiment of the invention. Apparatus 100 comprises a water-tight enclosure 101 enclosing a separation region 102 holding a volume of water 103 showing an upper boundary, leaving an upper volume in which a vacuum pressure may be established by a pump 104 drawing air from region 102 through a valved conduit 106 and expelling air through a conduit 105. Enclosure 101 in this example is supported on at least three leg supports 118 on a floor surface 107.

A valved conduit 112 passes through a wall of enclosure 101 beneath the surface of the water in the enclosure and connects outside the enclosure to a flexible tubing 113a that in turn connects to a hand-held application instrument 114. With pump 104 running, opening the valve in conduit 106 draws vacuum pressure in region 102 over the water and draws air through application instrument 114 through tubing 113a into enclosure 101 below the level of the water in the enclosure. Pet hair and other detritus drawn through hose 113 will be trapped in the water while the air bubbles up into the region over the water.

In this example a second flexible tubing 113b is shown connected to application instrument 114. Tubing 113b may be engaged to a separate conduit such as conduit 110 and may serve a different purpose than tubing 113a. In some circumstances the connection at application instrument 114 for tubing 113b may be capped by a plug and not used.

Application instrument 114 in one embodiment has a lower interface opposite the connections to the flexible hoses, where replaceable, interchangeable combs 121 may be engaged. The combs may be of different lengths and different lateral spacing for animals with different fur and hair characteristics.

At any chosen time, a user may operate valves of the apparatus though a control interface not shown but described in enabling detail below. The user, for example, may put the apparatus into a vacuum cleaning mode with pump 104 running by opening the valves in both conduits 106 and 112.

In this mode application instrument 114 may be moved over the body of an animal and loose hair and any other loose material may be drawn into water 103.

At another chosen time the user may terminate the vacuum cleaning mode, again manipulating the control interface, closing the valves in both conduits 106 and 112, and perhaps also turning off pump 104. A discharge mode may be selected which will open a valve in a discharge conduit 115 which may be positioned over a floor drain 116 in floor 107. In this example a removable strainer 117 is in place in floor drain 116, such that water 103, with the valve in conduit 115 open, and a vent valve in a conduit 119 also open, will be drained from enclosure 101 and filtered by strainer 117. Hair and other matter trapped in the water may be removed and trapped in strainer 117, which in turn may be removed from the floor drain and the hair and other matter carried away or transferred to another container. Pet hair is biodegradable and makes a good addition to gardens or flower beds.

In an alternative embodiment wherein no floor drain may be available, the enclosure 101 may be constructed such that leg supports 118 may be longer to be able to place an extra open topped container with a strainer beneath the enclosure, such that the water containing pet hair and other matter may be discharged into the extra open-topped container.

After the discharge operation an enclosure cleaning mode may be instituted leaving the valve in conduit 115 open and opening a valve in another conduit 108 connected to a pressurized water source. In one embodiment conduit 108 may enter a round enclosure 101 tangentially causing the water to impinge on the inner walls and flow downward, cleaning the walls and washing detritus out through conduit 115. At an end of the cleaning mode the valve in conduit 115 may be closed and water may refill enclosure 101 to a predetermined level.

A drying mode may be selected wherein a combination air pump and heater 109 may be operated to blow warm air with control of both volume and temperature out through a conduit 110. Conduit 110 may be connected by a tubing 113b as shown in FIG. 1, to application instrument 114 to provide a flow of warm air in a pet drying operation. In another embodiment application instrument 114 may be adapted to incorporate a combination vacuum and drying mode in which warm air may be provided to application instrument 114 while also drawing air in through the vacuum mode.

In yet another embodiment pump 109 may also include misting apparatus such that a warm fluid mist may be conducted to application instrument 114, and a choice of one or more solutions may be added to the mist to provide such as a desired aroma, and in some cases medicinal solutions.

Also illustrated in FIG. 1 is a tub 120 with a valved drain 121 which may in some circumstances be used to hold a dog, for example, during cleaning and treatment operations incorporating apparatus 100.

Figure 2A:
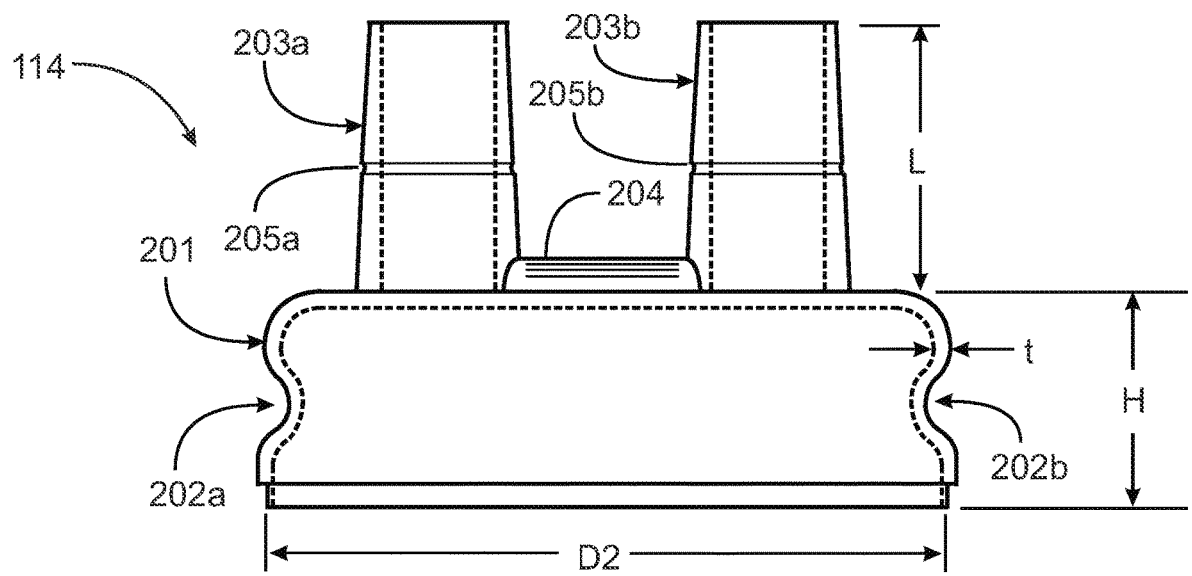
FIG. 2A is a side elevation view of an application instrument in an embodiment of the invention.

FIG. 2A is a side elevation view of application instrument 114 in one embodiment of the invention. In this embodiment application instrument 114 is a polymer molding having a circular body 201 of an overall diameter D1, with a wall thickness t, and a height H. Diameter D1 may be between 4 and 6 inches but may be more or less in some embodiments. Height H may be from 1 to 3 inches in this embodiment. There are in this example two funnel shaped connector conduits 203a and 203b with internal passages of a diameter d1 through a top wall of application instrument 114. Connector conduit 203a has a surface groove 205a and connector conduit 203b has a surface groove 205b, the groves identical in position and depth in this example. Connector conduits 203a and 203b are for coupling to especially configured flexible tubing in turn coupled to connector conduits of apparatus 100 to deliver materials or provide suction. One instance of the especially configured flexible tubing is illustrated as tubing 113 in FIG. 1. The especially configured flexible tubing is not shown in FIG. 2a or 2B. Coupling of the especially configured flexible tubing to conduits in embodiments of the invention is described in enabling detail below.

Connector conduits 203a and 203b are in this example joined by a rounded ridge 204. A lowermost portion of application instrument 114 has a diameter D2 less than diameter D1 for attachment of one or another of comb elements described below, but not shown in FIGS. 2A and 2B.

Figure 2B:
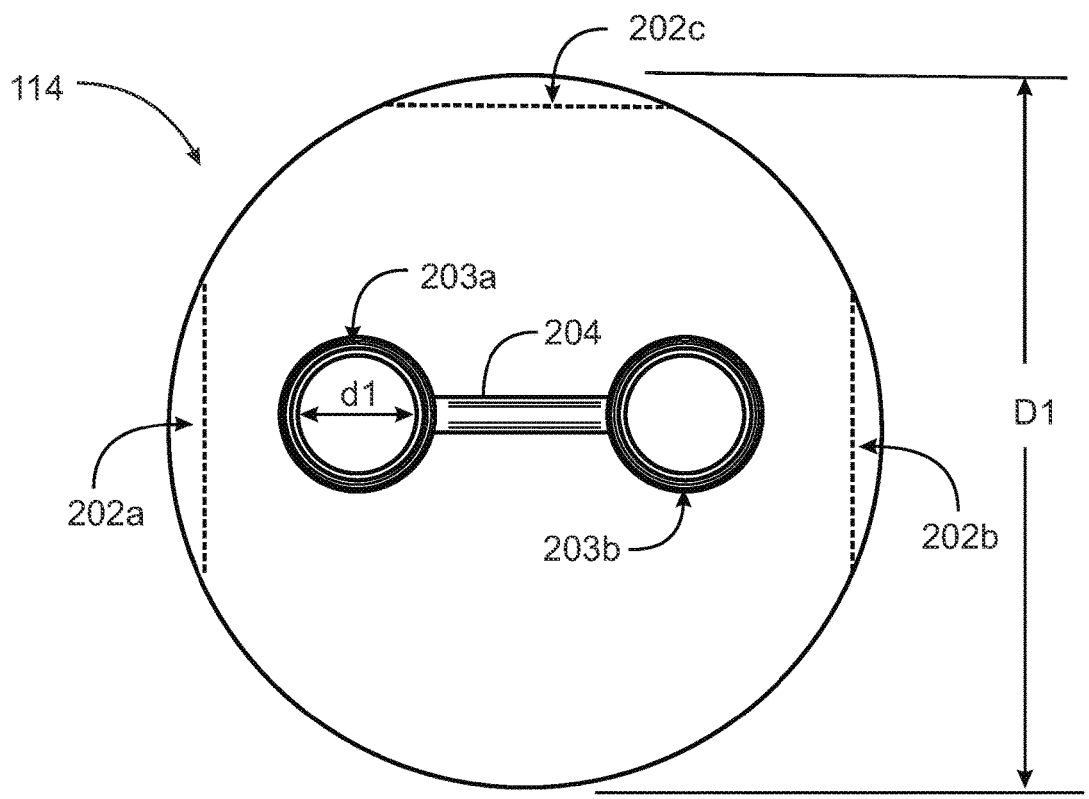
FIG. 2B is a top plan view of the application instrument of FIG. 2A.

FIGS. 3A and 3B illustrate a joining of an especially configured flexible tubing 304, such as tubing 113 of FIG. 1, and a funnel-shaped connector conduit 301, similar to connector conduits 203a and 203b of FIGS. 2A and 2B. In this example funnel-shaped connector conduit 301 has an external rounded groove 302 at one position along the length of the conduit. The open end of connector conduit 301 has an external diameter d2 and an internal diameter d1. The internal passage extends the full length of the connector conduit and through a wall 303.

Especially configured flexible tubing 304 is shown in partial section to better illustrate relationship of elements. The tubing has an outside diameter d3 and an internal diameter d4, and has an internal ridge 305 of a depth and width to match groove 302 in connector conduit 301. Diameter d4 is slightly larger than diameter d2 of connector conduit 301. In one embodiment of the invention a plurality of especially configured flexible tubings of different lengths are provided, all with common internal and external diameters, wall thickness, and internal ridges 305 on each end to mate with connector conduits such as conduits 301.

FIG. 3C illustrates connector conduit 301 and especially configured flexible tubing 304 of FIGS. 3A and 3B manually joined. Connector conduit 301 and especially configured flexible tubing 304 are both shown in partial section to better illustrate the engagement. In practice a user may grasp an end of the especially configured flexible tubing and push the tubing over the connector conduit until internal ridge 305 engages groove 302. Joined thusly the especially configured flexible tubing and the connector conduit are engaged in a manner that forces of suction and liquid delivery in operation will not dislodge the connection, and the connection is leak-tight. In practice a user may quickly and conveniently engage and disengage tubings to deliver different fluids, or warm air, or provide a vacuum connection.

Many instances of connector conduits and especially configured flexible tubings in a system according to an embodiment of the invention are of one size, but there may be matching connector conduits and especially configured flexible tubings of larger and smaller dimensions and through bore. Also, in many embodiments yje especially configured flexible tubings are made of a clear polymer, such as molded polyvinyl chloride (PVC) or other suitable polymer. In some circumstances tubings may also be internally reinforced.

It is known that in operating apparatus with vacuum and delivery tubings that one problem is in cleaning the tubings, especially between uses for a first animal and a second. One purpose of having an extra plurality of tubings such as tubings 113a and 113b is to have at all times a selection of clean and often sanitized tubings for replacement.

In one embodiment of apparatus 100 there may be a valved water outlet from enclosure 101, controlled to flow water controlled for temperature from cold to hot, enabling a user at a time of choice to connect tubings one by one, directed into perhaps tub 120, to clean the plurality of tubings. The same controlled water outlet may be connected to tubings to application instrument 114 for use in washing a pet. There may be in one embodiment an ability to provide detergent or other cleaning solution along with warm water.

In one embodiment a control panel may be provided with inputs to cause apparats 100 to be placed in any one of several different operating modes, as briefly mentioned above. Following is a listing of some operating modes:

1. Vacuum mode
   Vacuum pump 104 is turned on, valve in conduit 106 is opened, and valve in conduit 112 is opened.
2. Washing mode
   A valve is opened from a source of water to a tubing to application instrument 114 in one circumstance, enabling the user to wash a pet. This mode may also be used to clean flexible tubings.
3. Drying mode
   A valve is opened from heated air pump 109 to one of the connections to application instrument 114. May be used for drying an animal.
4. Dual vacuum/drying mode
   Two tubings to application instrument 114, one providing warm air, the other vacuum.
5. Misting mode
   A valve is opened from a misting apparatus to a tubing to one of the connections on application instrument 114. May be used for providing aromatic solutions as a mist.
6. Discharge mode
   Valves to tubings to application instrument 114 are closed, a vent valve is opened, and drain valve in bottom of enclosure 101 is opened, allowing water carrying pet hair to drain. May be filtered or strained for the pet hair to be used as mulch or for other purposes, being biodegradable.
7. Internal cleaning mode
8. Refill and reset mode
   Closes valve in discharge drain and in conduit to tubing to application instrument 114, and fills enclosure 101 to proper water height for vacuum operation.
9. Off/On In one embodiment there is control circuitry built into apparatus 100 connected to each valve, which in one embodiment are all solenoid operated valves. The various different modes are mostly initiated and controlled by the opening and closing of the solenoid operated valves.

In one embodiment control is through an interactive display on one of a smartphone or a pad device executing a mobile application. In one embodiment the interactive display is simply a list of the seven modes, each with a proximate virtual switch (radio button) to initiate the mode, as illustrated in FIG. 4. Each mode involves closing certain solenoid operated valves and opening others. The modes are mutually exclusive, and when one mode is activated the radio button for that mode is lighted, and all others are dark.

Figure 5:
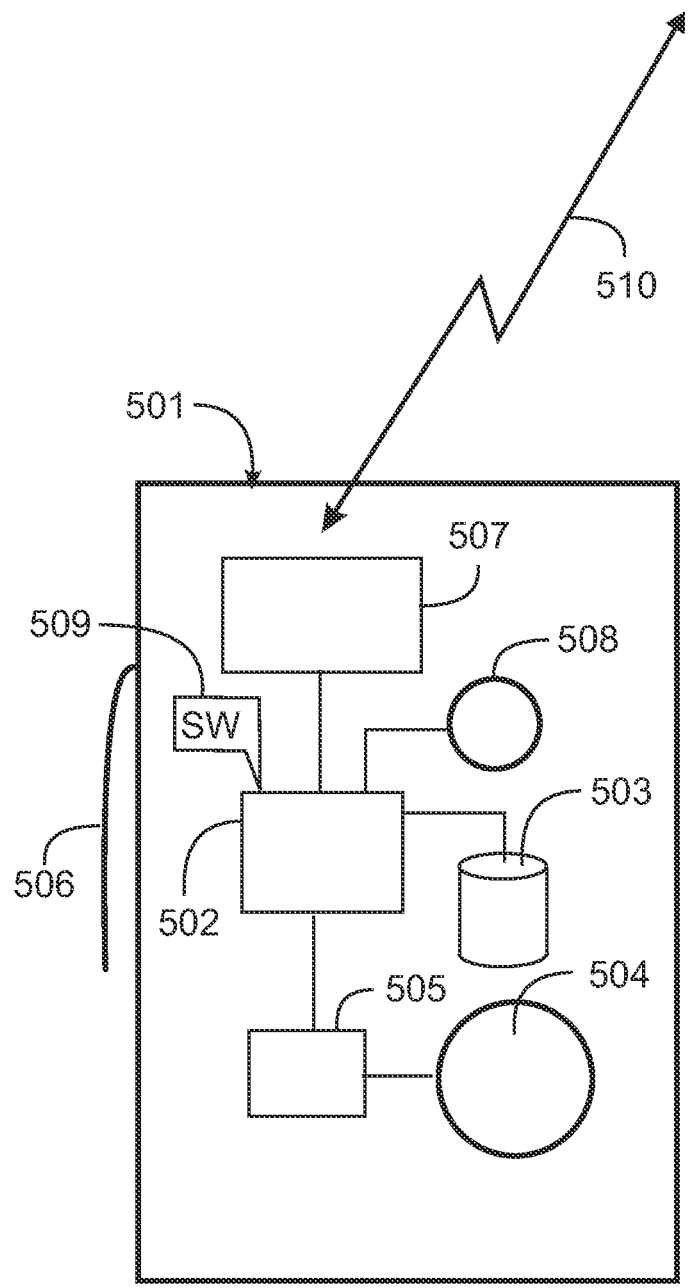
FIG. 5 is a diagram of a voice-activated unit in an embodiment of the invention.

In one embodiment, illustrated in FIG. 5, a speech enabled system 501 is incorporated wherein a wearable control unit 501 has a physical interface 506 for attaching to the user, such as clipping to the user's clothing, or the unit may be resident in a vest pocket, for example, to be proximate the user for responding to voice commands. Unit 501 has a CPU 502 coupled to a data repository 503 and executes a Software (SW) program of coded instructions 509 from the data repository. There is a microphone 504 connected to a voice recognition unit 505 that is adapted to signal CPU 502 uniquely in response to specific voice commands. CPU 502 is coupled to wireless communication circuitry 507 which signals wireless circuitry in apparatus 100 (arrow 510) to change modes and to make adjustments according to the voice commands received. Each mode shown in FIG. 4 may be a recognizable voice input to trigger that mode in apparatus 100.

In one embodiment Unit 501 also has a speaker 508 through which CPU 502 executing SW 509 may provide voice response to the user.

Figure 6:
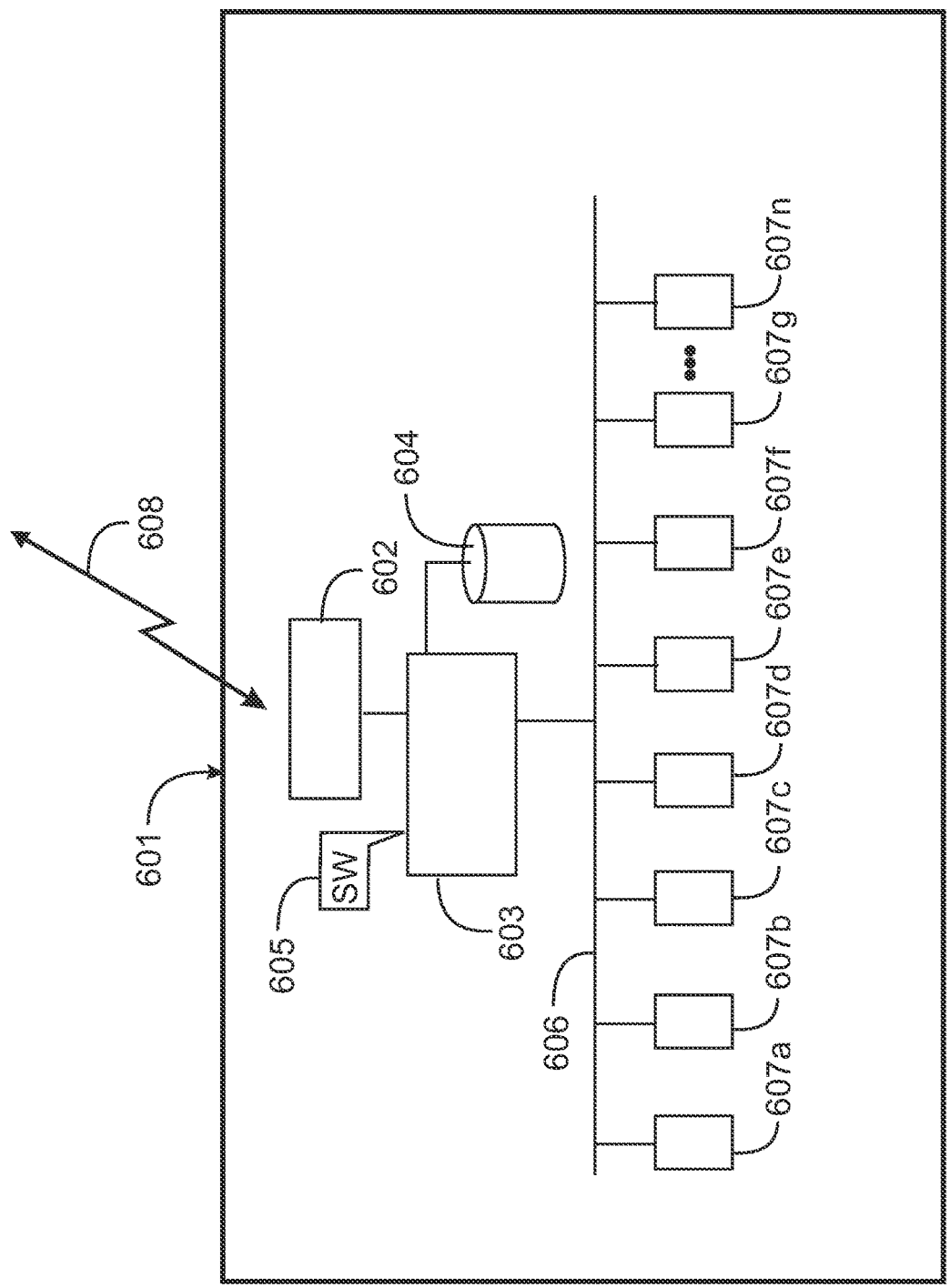
FIG. 6 is a diagram of exemplary electronic and electrical elements in a system according to an embodiment of the invention.
Figure 7A:
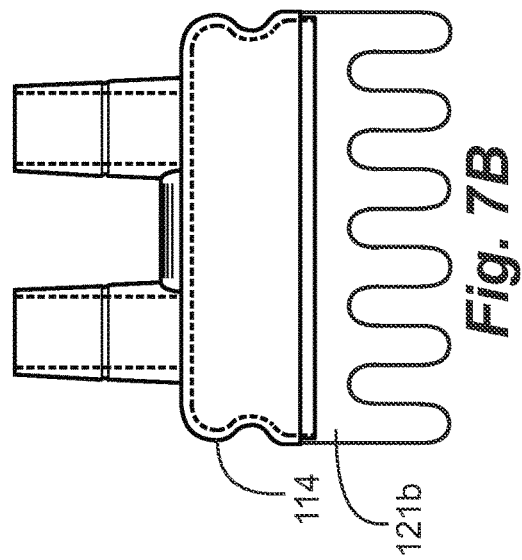
FIG. 7A is a side elevation view of an instrument with a comb in an embodiment of the invention.
Figure 7B:
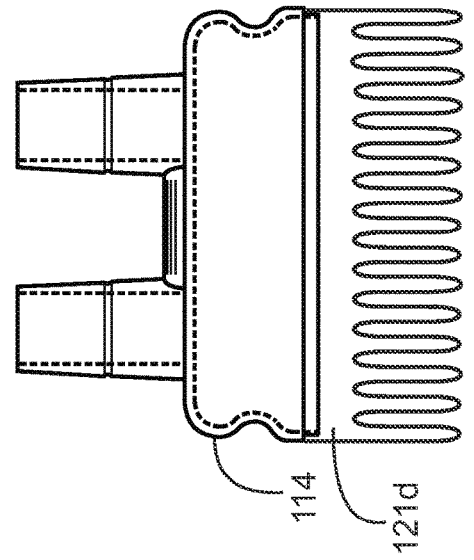
FIG. 7B is a side elevation view of an application instrument with a first alternative comb in an embodiment of the invention.
Figure 7C:
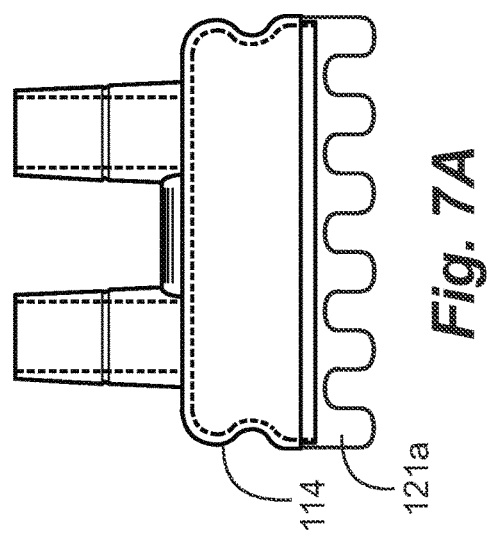
FIG. 7C is a side elevation view of an application instrument with a second alternative comb in an embodiment of the invention.
Figure 7D:
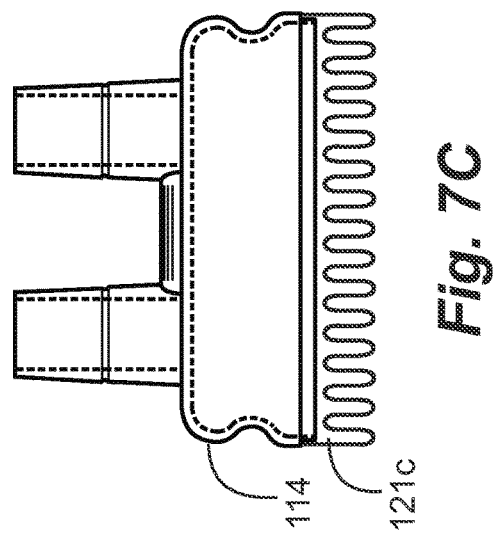
FIG. 7D is a side elevation view of an application instrument with a third alternative comb in an embodiment of the invention.

FIG. 6 illustrates control circuitry in apparatus 100 responsive through the wireless communication circuitry to unit 501 of FIG. 5. Control circuitry 601 comprises a CPU 603 coupled to a data repository 604 and executes SW 605 from the data repository. Commands for various functions come from unit 501 via wireless communication circuitry 602. Arrow 608 represents wireless commands and data transfer, which may be both ways.

CPU 603 is coupled to a plurality of electronic and electrical apparatus labeled 607a through 607n. Individual ones of the apparatus labeled 607a through 607n may be circuitry to open and close individual valves, some of which are indicated in FIG. 1. For example, in FIG. 1 it may be seen that there is a valve in conduit 106 that need be opened to draw vacuum over the water in enclosure 101. Similarly, there are valves in conduits 119, 108, 112 and 115. In some embodiments these and other valves may be solenoid operated, and the circuitry may be adapted to only fully open or fully close the valve. This may be the case with the valve in discharge conduit 115, for example. In other embodiments a valve may have more than one position and may be opened part way or fully. In other embodiments a valve may be implemented to be variable and may assume a controlled position from fully closed to fully open. In another embodiment a flow may be regulated by opening one valve and controlling another valve in line to vary flow.

It was described above with reference to FIG. 1 that replaceable, interchangeable combs of different lengths and different lateral spacing may be engaged to application instrument 114 for use with animals with different hair characteristics.

FIGS. 7A through 7D show a side elevation view of application instrument 114 with four different combs 122a through 122d engaged to the application instrument. The four combs shown are just a small subset of the many different combs that might be used. It may be noted in FIG. 2A that diameter D2 is formed as a step down from the larger diameter of application instrument 114, and there is a shoulder implemented that in one embodiment is a fit to an inside diameter of an upper interface on each of the different combs that may be provided. In one embodiment the diameters are carefully controlled such that a comb fits closely onto the outer diameter at the lower portion of application instrument 114, and no further connection may be necessary. In another embodiment there is an attachment mechanism, which may be any one of several sorts. In one embodiment there is a single or partial spiral thread element on each of the application instruments, and the comb to enable the comb to be placed over the shoulder of the application instrument at to be engaged by a partial rotation.

Figure 8:
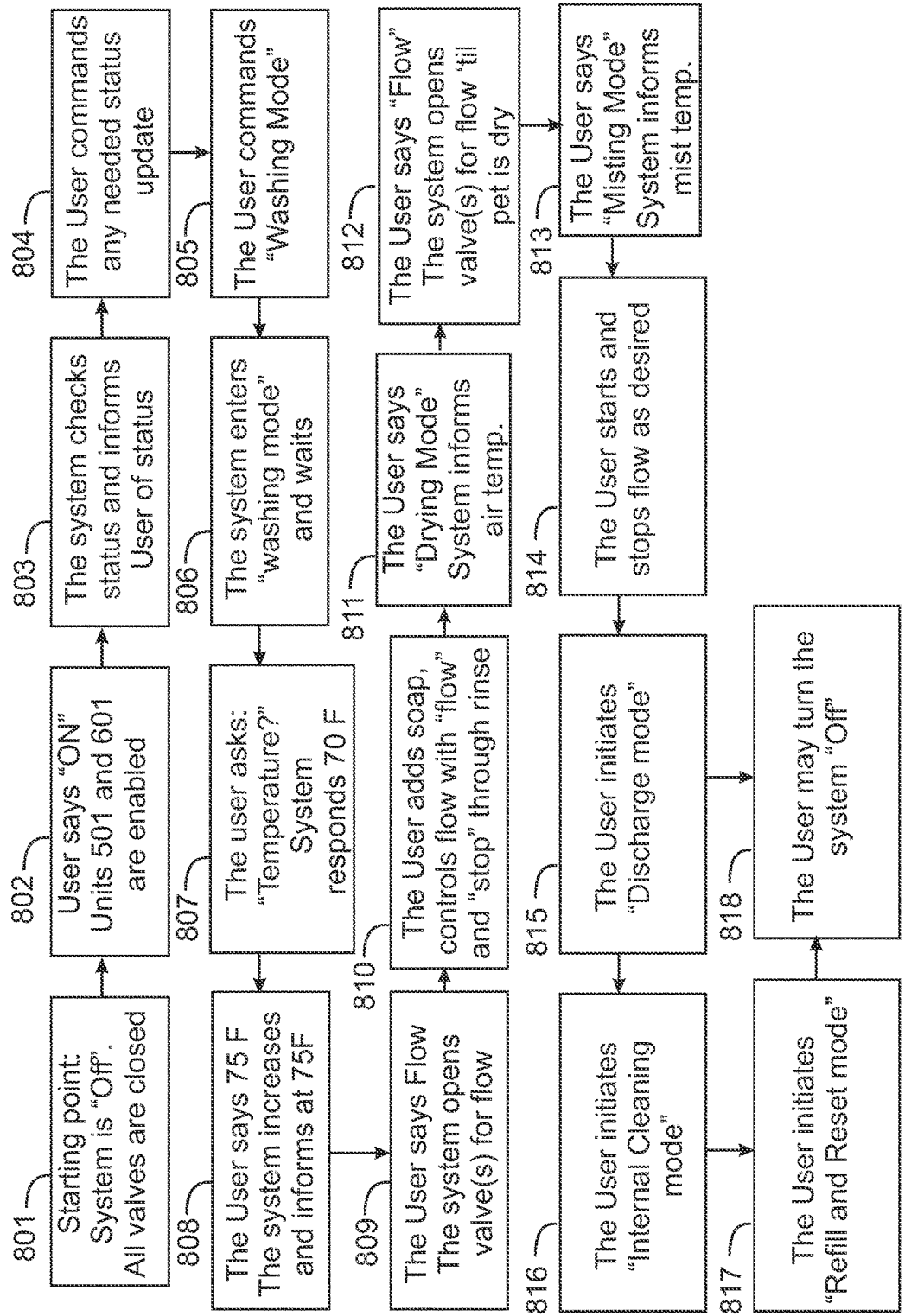
FIG. 8 is an exemplary flow diagram illustrating steps of a process in an embodiment of the invention.

FIG. 8 is an exemplary flow diagram depicting a process in use of apparatus 100 in cleaning and treating an animal in one embodiment of the invention. Step 801 is a starting point, in which the system is "off" with all valves closed and no functions in process. At step 802 the user commands "On" through voice recognition through unit 501, which command is sent to unit 601, and CPU 603, executing SW 605 turns on power and does, in one embodiment, a self-check. If the self-check indicates there is a fault the system may inform the user through speaker 508 that there is a problem, in some case what the problem is, and the user may command "off", and endeavor to correct the problem. The system informs the user of the status at step 803, and the user commands any needed update at step 804.

At step 805 the user commands "Washing Mode", which in many cases will be a first process in treatment, requiring flow of warm water through an exit conduit, such as conduit 110, through a connected flexible tubing to application instrument 114. The system enters the washing mode, which is a loop in SW 605, and waits for further commands. At step 807 the user asks the temperature of the water available for washing, and the system responds. In an alternative embodiment the system tells the temperature when the user commands the washing mode.

At step 808 the user can adjust the water temperature for washing. At step 809 the user commands "Flow" and water flows to application instrument 114. The user may add soap, manipulate application instrument 114, and go through a thorough rinse at step 810. The user may adjust the volume flow and temperature of the water with suitable commands while in the washing mode.

At step 811 the user commands drying mode, and the system tells the air temp for drying, and waits. The user may adjust the temperature, and initiates flow at step 812. The user may start and stop flow and change the temperature, manipulating application instrument 114 until the pet is dry. At steps 813 and 814 the user commands a misting mode, wherein a warm mist is provided at a gentle flow to application instrument 114. The mist may have medical ingredients and/or aromatic ingredients for a pleasant odor.

At step 815 the user initiates a discharge mode in which the water in enclosure 101 may be emptied. At step 816 an internal cleaning mode is entered, in which, with the enclosure empty, water may be forcefully directed against the internal walls of the enclosure to clean the enclosure.

A unique mode of the system not described in regard to FIG. 8 is a vacuum mode wherein a strong vacuum may be coupled to application instrument 114 through a valved conduit. This mode is implemented by opening a valve in a conduit 106 to draw a strong vacuum in a space of a volume of water in enclosure 101, as shown in FIG. 1. This vacuum mode may be a first step in an overall process, before a pet is washed or wetted, and may remove excess hair from a shedding animal as well as dirt, and any other detritus. Alternatively vacuum may be used after washing, or after drying to remove excess hair and detritus. Air from application instrument 114 in vacuum mode is pulled under water and hair and detritus is captured in the water. It may be noted that application instrument 114 has two input conduits 205a and 205b so vacuum may be performed while another mode is in progress. Vacuum may be applied during drying mode as well, and there may be a dual vacuum and drying mode.

The skilled person will understand from the description of control apparatus and operations is that the system may be placed, by voice command, in any one of a plurality of modes. While in a mode certain voice commands are enabled, and all other voice reception is ignored. For example, with the system in Washing Mode, the command more may cause the system to increase the flow of water to application instrument 114, but if the system is in Discharge Mode the word "more" is ignored. Specific commands and resulting functions are enabled in each mode.

The inventor believes the pet cleaning and treatment apparatus and functions of the apparatus provided as described above provides a unique system with many advantages over existing systems. For example, the vacuum apparatus and function draws hair and other material from the pet and draws the ingested material through a volume of water to separate the material. The water may be discharged, and the material strained from the water. There are no filters of any material to be discarded. The structure of the hand-held application instrument is also unique and easy to use. The voice activated control system leaves the users hands free for other tasks. The nature of the flexible tubings and the conduits they engage provides a process for quick and sure exchange of tubings. Cleaning of the equipment is improved. There are many advances and advantages over the existing state of the art.

The skilled person will understand that the embodiments illustrated and described are all exemplary, and not limiting to the scope of the invention. There are many alterations that might be made to the embodiments described within the scope of the invention. The scope is limited only by the claims.

The invention claimed is:
1. A pet cleaning and treatment system, comprising:
an enclosure supported on a floor surface on legs;
a water reservoir in the enclosure adapted to hold a volume of water with an empty region over the water, the enclosure having a first solenoid valve in a first connector conduit through a wall of the enclosure opening on one end beneath a surface of the water and on an opposite end outside the enclosure;
a vacuum module in the enclosure, comprising a vacuum pump with a solenoid operated valved inlet conduit opening in the empty region over the water, and an exhaust conduit through a wall of the enclosure;
a substantially round, hand-held application instrument having a substantially cylindrical wall with a top closure, open at a lower extremity, with a second and a third connector conduit extending through the top closure upward away from the top closure;
a plurality of especially configured flexible tubings open on both ends, adapted to engage the connector conduits;
a source of heated water in the enclosure with a fourth solenoid valved connector conduit through the wall of the enclosure, adapted to engage one of the especially configured flexible tubings;
a source of heated air within the enclosure with a fifth solenoid valved connector conduit through the wall of the enclosure, adapted to engage one of the especially configured flexible tubings;
a source of heated mist within the enclosure with a sixth solenoid valved connector conduit through the wall of the enclosure, adapted to engage one of the especially configured flexible tubings; and
control apparatus and circuitry adapted to receive input from a user and to accordingly selectively operate functional apparatus of the system including the solenoid operated valves;
characterized in that the user connects one of the especially configured flexible tubings to one of the connector conduits on the application instrument and to one of the solenoid valved connector conduits on the enclosure, provides control input through the control apparatus, and grasps and manipulates the application instrument to treat the pet.

2. The system of claim 1 wherein the control apparatus and circuitry comprises an on-board CPU coupled to a data repository, the CPU executing coded instructions enabling the CPU, in response to user input, to selectively open and close the solenoid operated valves and to selectively operate electrical heaters and pumps.

3. The system of claim 2 wherein the system is placed exclusively in one or another operating mode by user input, individual modes being associated exclusively with operation of specific apparatus of the system.

4. The system of claim 3 wherein the system is placed in a vacuum mode by user input with an especially configured flexible tubing connected to a valved conduit through a wall of the enclosure, the valved conduit connected internally to the vacuum module in the enclosure, with the especially configured flexible tubing connected at one end to one of the connector conduits of the application instrument, enabling the user to manipulate the application instrument to vacuum the hair of the pet.

5. The system of claim 3 wherein the system is placed in a washing mode by user input, with an especially configured flexible tubing connected to a valved conduit through a wall of the enclosure, the valved conduit connected internally to the source of heated water in the enclosure, with the especially configured flexible tubing connected at one end to one of the connector conduits of the application instrument, enabling the user to manipulate the application instrument to wet the hair of the pet, to add soap to wash the hair of the pet, and to rinse the hair of the pet after washing.

6. The system of claim 5 wherein the user is enabled through the control apparatus and circuitry to selectively start and stop the flow of heated water, and also to increase or decrease the temperature of the heated water.

7. The system of claim 3 wherein the system is placed in a drying mode by user input, with an especially configured flexible tubing connected to a valved conduit through a wall of the enclosure, the valved conduit connected internally to the source of heated air in the enclosure, with the especially configured flexible tubing connected at one end to one of the connector conduits of the application instrument, enabling the user to manipulate the application instrument to dry the hair of the pet.

8. The system of claim 3 wherein the system is placed in a dual vacuum and drying mode by user input, with a first especially configured flexible tubing connected to a connector conduit in turn connected to the vacuum system, and to a first of the connector conduits on the application instrument, and a second especially configured flexible tubing connected to a connector conduit in turn connected to the source of heated air, with the second especially configured flexible tubing also connected to the second of the connector conduits on the application instrument, enabling the user to employ both vacuum and heated air in drying the pet.

9. The system of claim 3 wherein the system is placed in a misting mode by user input, with a first especially configured flexible tubing connected to a connector conduit in turn connected to the source of heated mist, and to a first of the connector conduits on the application instrument, enabling the user to apply heated mist to the hair of the pet.

10. The system of claim 3 wherein the system is placed in a discharge mode by user input, enabling the user to open both a solenoid operated discharge valve in a conduit through a bottom wall of the enclosure and a solenoid operated vent valve in the enclosure above the water level to drain the water reservoir.

11. The system of claim 3 wherein the system is placed in an internal cleaning mode by user input, further comprising a solenoid operated input valve in a conduit through a side wall of the enclosure connectable to a source of water under pressure, the input valve operable to clean inner walls of the enclosure with water sprayed under pressure with the discharge valve open.

12. The system of claim 3 wherein the system is placed in a refill and reset mode, enabling the user to close the discharge valve and to open the solenoid operated input valve, the system monitoring a water level sensor, refilling the water reservoir to a select depth, then closing the input valve and turning the system off.

13. The system of claim 1 wherein each connector conduit has a tapered body with a minimum diameter at one end of the body, a central through bore, and a concentric groove around an outside wall of the tapered body at a specific position along a length of the body, and each especially configured flexible tubing has a smooth inside diameter substantially the same as the minimum diameter of the tapered body of the connector conduit, and an internal circular ridge with dimensions matching the groove in the tapered body of the connector conduit, such that the especially configured flexible tubing is urged over the tapered body of the connector conduit until the internal circular ridge engages the groove in the tapered body, completing a secure joining of the especially configured flexible tubing to the connector conduit.

14. The system of claim 1 wherein the control apparatus and circuitry adapted to receive input from a user and to accordingly selectively operate functional apparatus of the system including the solenoid operated valves, comprises internal apparatus with a CPU and a coupled data repository, the CPU executing coded instructions from the data repository, the CPU coupled to solenoid operated valves of the system and to electrical and electronic elements and adapted to operate the valves and electronic and electrical elements, and the input from the user is through touch screen indicia on an interactive display of a smartphone or a pad device.

15. The system of claim 1 further comprising a voice activated control apparatus adapted to be proximate the user, the voice activated apparatus having a CPU and a coupled data repository and executing coded instructions from the data repository, and having wireless communication circuitry adapted to transmit commands to compatible wireless communication circuitry in the control apparatus and circuitry in the enclosure, wherein a user is enabled to select and activate different operating modes by voice command though a microphone of the voice activated control apparatus, and to control system functions in the different modes by voice command.

16. The system of claim 15 wherein the voice activated control apparatus further comprises a speaker, and the internal control system is enabled to provide responses to voice commands back to the user through the speaker.

17. The system of claim 1 wherein the application instrument has a physical interface whereby a variety of combs of different length and lateral spacing are interchangeably mounted.

* * * * *